July 16, 1968    R. H. PARKER    3,392,796
ELECTRICALLY PROPELLED VEHICLE
Filed Feb. 21, 1966    2 Sheets-Sheet 1
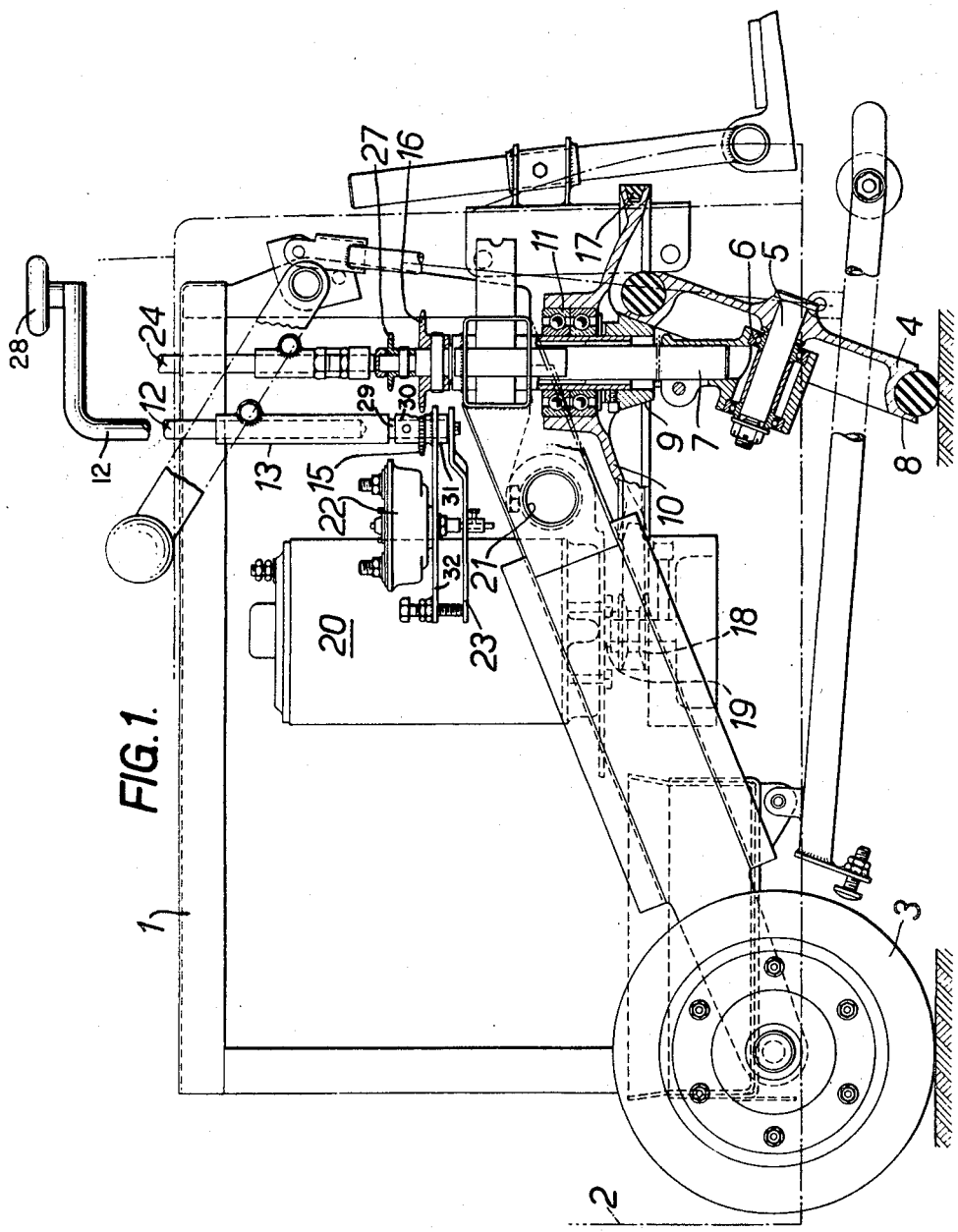
INVENTOR
ROBERT HENRY PARKER
By: Morris & Bateman Atty

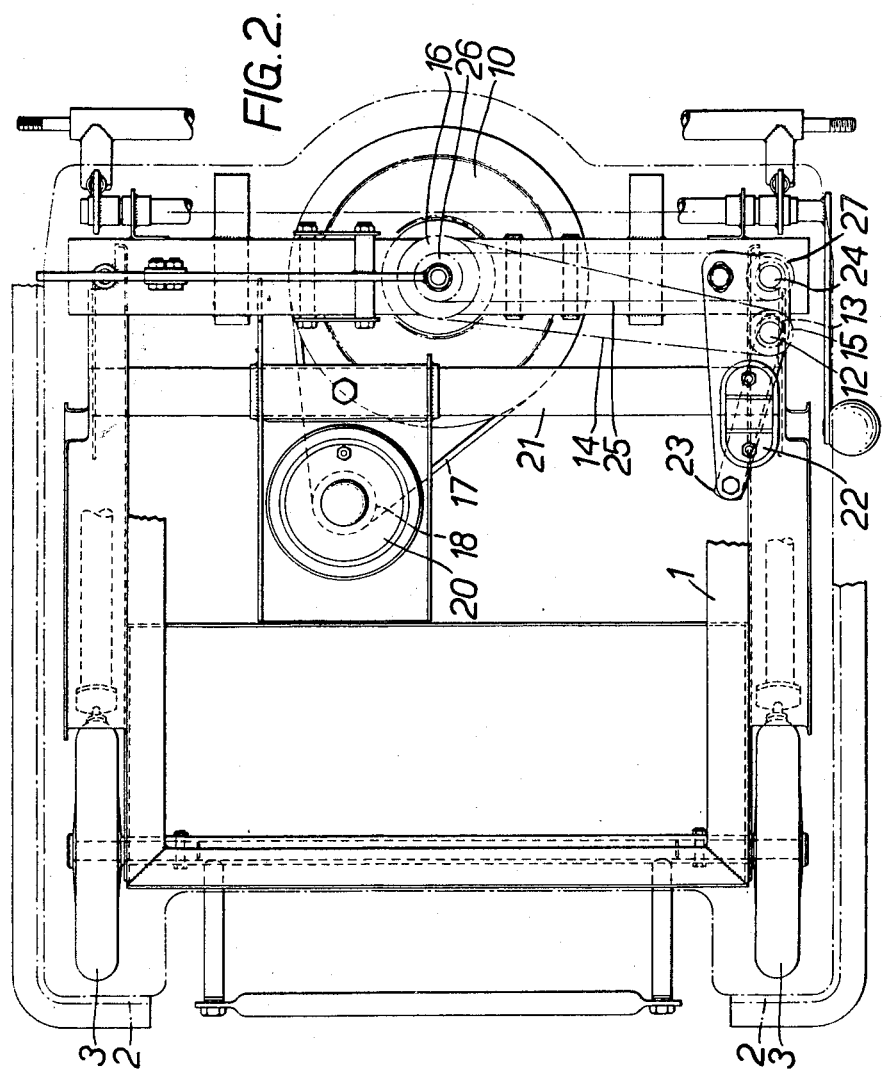

United States Patent Office 3,392,796
Patented July 16, 1968

3,392,796
ELECTRICALLY PROPELLED VEHICLE
Robert Henry Parker, Esher, England, assignor to A. C. Cars Limited, Thames Ditton, Surrey, England, a British company
Filed Feb. 21, 1966, Ser. No. 529,122
8 Claims. (Cl. 180—26)

ABSTRACT OF THE DISCLOSURE

An electrically propelled invalid chair or other vehicle has two non-drivable rear wheels and a single steerable, motor driven front wheel. The steerable wheel is mounted on the central axis of the vehicle at an inclination to the vertical and is operatively connected to a driving member rotatable about a vertical axis by the vehicle motor and to a steering member which is rotatable through 360° about the same axis as the driving member. The steering member is rotated by a manually operable control member situated at the upper end of a vertical steering column which is rotatably mounted in the frame of the vehicle, and the control member is actuated by the occupant of the vehicle.

---

This invention relates to electrically propelled vehicles of the kind in which the motor drives a steerable wheel and it is an object of the invention to provide an improved drive for such vehicles.

According to the invention the drivable and steerable wheel is mounted at an inclination to the vertical and is operatively connected to driving and steering members which are relatively rotatable about a common vertical axis by the vehicle motor and a manually operated control member respectively.

A preferred form of the invention will be described in detail with reference to the accompanying drawings in which:

FIGURE 1 is a side elevation, partly in section, and
FIGURE 2 is a plan of the lower part of an electrically propelled invalid chair incorporating the invention.

The chair shown has a metal frame 1 supporting a fibreglass body shell 2 and is mounted on a pair of rear wheels 3 and a single, centrally located, front wheel 4 mounted on a stub axle 5 inclined at an angle to the horizontal and freely rotatable in bearings 6 carried by the lower end of a vertical shaft 7. One side of the wheel 4 is provided with an annular friction surface 8 in driving engagement with a friction cone 9 carried by a pulley 10 rotatably mounted on the shaft 7 with the interposition of bearings 11. The shaft 7 is rotatable through 360° about its axis by movement of a control handle 28 at the upper end of an actuating member 12 secured in a steering column 13 which is rotatably mounted on one side of the frame 1. The column 13 is operatively connected to the shaft 7 by a chain 14 passing around sprockets 15 and 16 at the lower end of the column 13 and the upper end of the shaft 7 respectively. The pulley 10 is driven by a V-belt 17 from a pulley 18 on the shaft 19 of a motor 20 powered by a battery (not shown) and adjustable laterally, with respect to the longitudinal centre line of the chair, along a tube 21 secured to the frame 1 to vary the tension on the belt. Operation of the motor 20 is controlled by a switch 22 connected to the battery through a master switch (not shown) on the side of the frame 1 and operable by the actuating member 12 acting on switch plate 23 when the control handle is depressed against spring action by the occupant of the chair. As shown in FIGURE 1, switch 22 is secured to a stationary plate 32 that is suitably mounted by means (not shown) on the frame. Switch 22 is operated from actuating member 12 and steering column 13 by an extension 29 connected to move switch plate 23 when the control handle 28 is depressed by the occupant of the chair. Extension 29 passes slidably but non-rotatably through hub 30 of the sprocket 15 and a collar 31 fixed to plate 32. After release the handle is returned upwardly by suitable spring means (not shown). A socket (not shown) is preferably fitted to the battery for connection to a battery charger without it being necessary to remove the battery from the chair.

To operate the chair the occupant closes the master switch and presses lightly on the control handle to close the switch 22 and start the motor 20 which immediately drives the front wheel through the belt drive 18, 17, 10 and the friction drive 8, 9. Steering is performed by angular movement of the control handle which is transmitted to the shaft 7 through chain drive 14, 15, 16. The sprockets 16, 15 are in a 2–1 ratio and in order to enable the occupant of the chair to know at all times the direction in which the front wheel 4 is pointing, an indicator (not shown) is provided on the upper end of a shaft 24 journalled in one side of the frame 1 and rotatable with the shaft 7 by means of a chain 25 passing around equl diameter sprockets 26 and 27 on the shafts 7 and 24 respectively.

The effect of the driving torque on the string is compensated by the inclination of the front wheel 4, the most suitable degree of inclination depending somewhat on the size of the wheel and the power of the motor 20. To reverse the drive it is merely necessary to turn the control handle through 360°, thus eliminating the necessity for a reversible driving motor although such may be used if required together with the additional control means therefor.

The friction drive to the wheel 4 may, if required, be replaced by bevel gearing and the invention in its broadest form is applicable to many other forms of electrically propelled vehicles in addition to invalid chairs.

I claim:
1. An electrically propelled vehicle comprising a wheeled frame, a driving motor mounted on said frame for connection to a source of operating current, a driving member operatively connected to said driving motor for rotation about a vertical axis on said frame, a manually operable control member mounted on said frame for operation by the vehicle driver, a steering member comprising a vertical shaft operatively connected to said control member for rotation relative to said driving member about the same vertical axis, and a drivable and steerable wheel operatively connected to said driving member and mounted on an axle which is inclined at an angle to the horizontal and is rotatable in bearings at the lower end of said steering member.

2. A vehicle according to claim 1, wherein said drivable and steerable wheel is centrally mounted adjacent the forward end of the vehicle.

3. A vehicle according to claim 1, wherein said control member comprises a handle situated at the upper end of a vertical steering column rotatably mounted on said vehicle frame and operatively connected to said steering member by a chain drive.

4. A vehicle according to claim 1, wherein one side of said wheel is provided with an annular friction surface in driving engagement with a friction cone constituting said driving member and surrounding said steering member.

5. A vehicle according to claim 1, wherein said driving member is carried by a pulley operatively connected by a V-belt to a pulley driven by the vehicle driving motor.

6. A vehicle according to claim 5, wherein said driving motor is adjustable laterally with respect to the longitudinal centre line of the vehicle to vary the tension on said V-belt.

7. A vehicle according to claim 1, wherein the operation of said driving motor is controlled by a switch actuable by depression of said control member.

8. A vehicle according to claim 1 wherein the frame carries a body in the form of an invalid chair.

References Cited

UNITED STATES PATENTS

| | | | |
|---|---|---|---|
| 1,310,542 | 7/1919 | Pratt | 180—26 |
| 1,461,735 | 7/1923 | Peters | 180—26 |
| 1,833,844 | 11/1931 | Lusse | 180—26 |
| 2,306,042 | 12/1942 | Custer | 180—26 |
| 2,482,203 | 9/1949 | Peterson et al. | 180—65 |
| 2,879,859 | 3/1959 | Swisher | 180—26 |
| 3,112,594 | 12/1963 | Hallenbeck | 180—26 X |
| 3,282,364 | 11/1966 | Cramp | 180—26 |

KENNETH H. BETTS, *Primary Examiner.*